(12) United States Patent
Yonezawa

(10) Patent No.: US 6,805,002 B2
(45) Date of Patent: Oct. 19, 2004

(54) AIR FLOW RATE MEASURING APPARATUS

(75) Inventor: Fumiyoshi Yonezawa, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 10/425,867

(22) Filed: Apr. 30, 2003

(65) Prior Publication Data
US 2003/0209068 A1 Nov. 13, 2003

(30) Foreign Application Priority Data
May 13, 2002 (JP) ..................... 2002-136919

(51) Int. Cl.⁷ ............................... G01F 1/68
(52) U.S. Cl. .................................. 73/204.22
(58) Field of Search .................. 73/202.5, 204.22, 73/204.11

(56) References Cited

U.S. PATENT DOCUMENTS 5,540,107 A * 7/1996 Silverman et al. ....... 73/861.78
6,578,414 B2 * 6/2003 Kohmura et al. .......... 73/202

FOREIGN PATENT DOCUMENTS

| JP | 9-210016 A | 8/1997 |
| JP | 11-101676 A | 4/1999 |
| JP | 11-132809 A | 5/1999 |
| JP | 2000-2569 A | 1/2000 |
| JP | 2000-162009 A | 6/2000 |
| JP | 2000-241222 A | 9/2000 |
| JP | 2001-99688 A | 4/2001 |

* cited by examiner

Primary Examiner—Harshad Patel
(74) Attorney, Agent, or Firm—Sughrue Mion, PLLC

(57) ABSTRACT

A circuit case is disposed integrally on a first side of a joint portion formed with a circular cross section, and a measuring conduit is disposed so as to extend from a second side of the joint portion. A pair of mounting portions are disposed so as to extend in flange shapes from the circuit case on mutually opposite sides of the joint portion, and a mounting aperture is disposed through each of the mounting portions. A lower surface of each of the mounting portions is formed so as to have a stepped portion, a wall surface of the stepped portion constituting a position regulating portion.

6 Claims, 11 Drawing Sheets

F I G. 7
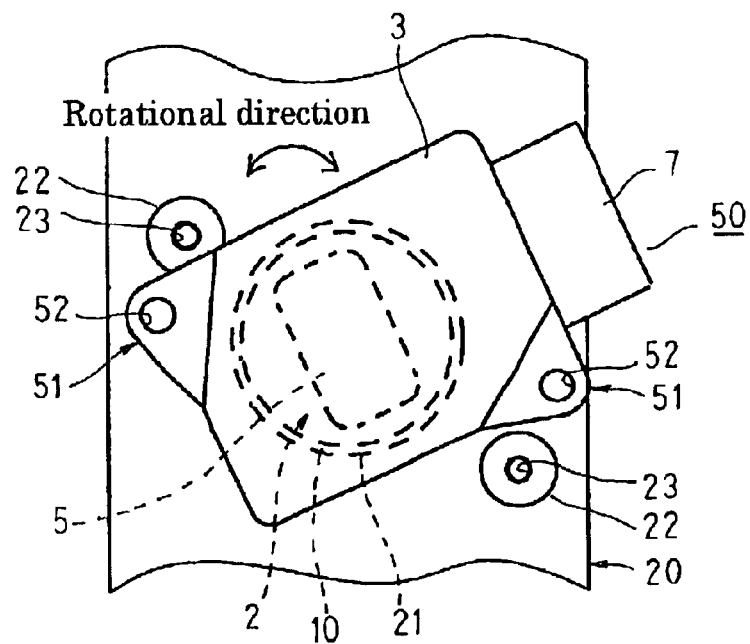
F I G. 8
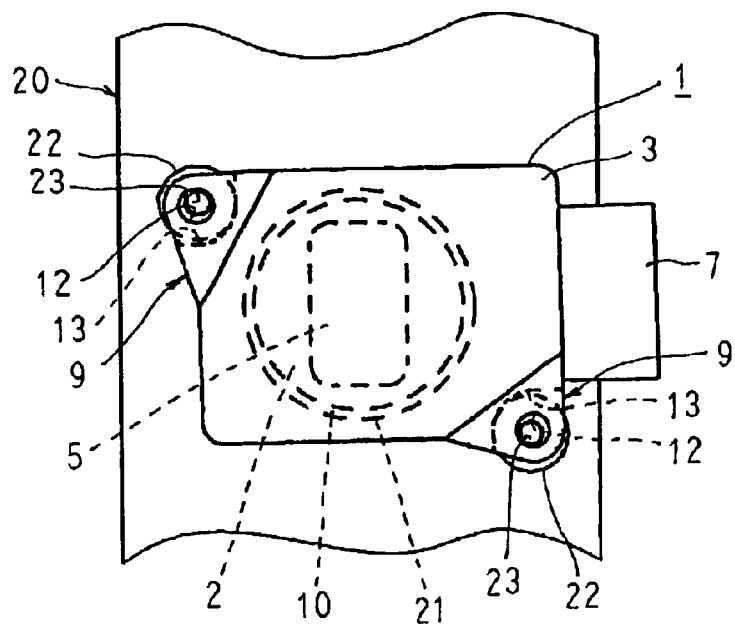

AIR FLOW RATE MEASURING APPARATUS

BACKGROUND OF THE INVENTION

1. Field of the Invention

The present invention relates to a flow measuring apparatus for measuring an air flow rate and to a construction for mounting the flow measuring apparatus, and particularly relates to an air flow measuring apparatus suitable for measuring a flow rate of intake air drawn in by an engine of an automobile.

2. Description of the Related Art

Air flow rate measuring apparatuses for measuring an air flow rate such as those disclosed in Japanese Patent Laid-Open No. 2001-099688 and Japanese Patent Laid-Open No. 2000-162009, for example, are already known.

A first conventional air flow rate measuring apparatus, disclosed in Japanese Patent Laid-Open No. 2001-099688, is constructed such that a measuring conduit enveloping a flow rate detecting element for measuring an air flow rate and a control circuit portion for outputting a detection signal from this flow rate detecting element are formed into an integrated module. To measure the air flow rate, this first conventional air flow rate measuring apparatus is fixed to an air flow line through which the air being measured flows such that the measuring conduit extends into the air flow line. Moreover, when this first conventional air flow rate measuring apparatus is applied to measurement of the flow rate of intake air drawn into an engine of an automobile, the air flow line may be a duct disposed in an air cleaner or downstream from the air cleaner, for example.

This first conventional air flow rate measuring apparatus is formed into a module in which the measuring conduit is disposed on a lower surface of a base member and the control circuit portion is fixed to an upper surface of the base member. A joint portion is disposed at a boundary between the base member and the measuring conduit. This joint portion is formed with a circular cross section having a small diameter capable of enveloping the cross section of the measuring conduit, and a groove portion for mounting an O ring is recessed into an outer peripheral wall surface of the joint portion. Two mounting apertures are disposed in the base member and the control circuit portion so as to be positioned on mutually opposite sides of the joint portion.

The first conventional air flow rate measuring apparatus is mounted to the air flow line by inserting the measuring conduit through an insertion aperture disposed through a wall surface of the air flow line with the O ring mounted in the groove portion, passing mounting screws through the two mounting apertures, and securely fastening each into threaded apertures of bosses disposed on the air flow line. The O ring is held between the joint portion and the inner wall surface of the insertion aperture, ensuring the airtightness of the air flow line.

A second conventional air flow rate measuring apparatus is disclosed in Japanese Patent Laid-Open No. 2000-162009 in which a metal member formed with grooves and steps is disposed on the base member and the control circuit portion, and protrusions engaging the grooves and steps are disposed on an outer wall surface of the air flow line. It is claimed that when this second conventional air flow rate measuring apparatus is mounted to the air flow line, the grooves and steps of the metal member and the protrusions are made to engage each other, enabling irregularities in assembly to be reduced.

In the first conventional air flow rate measuring apparatus, because the joint portion is formed with a circular cross section and the bosses of the base member and the air flow line are formed on a common plane, the range of rotational movement of this measuring apparatus with the measuring conduit inserted into the insertion aperture of the air flow line is large. Thus, it is difficult to align the positions of the mounting apertures on the measuring apparatus and the threaded apertures of the bosses on the air flow line with the measuring conduit merely inserted into the insertion aperture, making it is necessary to position the mounting apertures and the threaded apertures of the bosses while rotating the first conventional air flow rate measuring apparatus with the measuring conduit inserted before fastening the mounting screws.

Generally, the two mounting screws are fastened on one side at a time. Thus, in cases where the mounting apertures and the threaded apertures of the bosses have been made with dimensional tolerances in mutually opposite directions relative to set values, for example, even if the fastening of one screw is performed, the other screw cannot be fastened, making it necessary to loosen the mounting screw which was fastened first and make fine adjustments to the positions of the mounting apertures and the threaded apertures of the bosses. In other words, it is necessary to fasten the mounting screws twice.

Thus, in the first conventional air flow rate measuring apparatus, one problem has been that insertability into the air flow line and workability of the fastening of the screws have been poor.

In the second conventional air flow rate measuring apparatus, it is necessary to dispose the metal member on the apparatus and machining must be performed to form the grooves and the steps on the metal member, and in addition, protrusions for engaging the grooves and the steps of the metal member must be disposed on the air flow line, etc., placing constraints on manufacture and giving rise to cost increases. Furthermore, if the shapes of the grooves of the metal member and the protrusions on the air flow line are set such that mountability of the second conventional air flow rate measuring apparatus is not lost, the protruding portions may be fine and weak, and there is concern that the protruding portions may be damaged during insertion of the measuring apparatus or during fastening, preventing the desired effects from being achieved.

SUMMARY OF THE INVENTION

The present invention aims to solve the above problems and an object of the present invention is to provide an inexpensive air flow rate measuring apparatus having a superior rate of production enabling mountability to an air flow line to be improved by providing a position regulating portion for regulating position relative to an air flow line and enabling flow rate detection precision to be ensured by suppressing rotational assembly irregularities.

With the above object in view, according to a first aspect of the present invention, there is provided an air flow rate measuring apparatus for measuring a rate of air flow flowing inside an air flow line, the air flow rate measuring apparatus being mounted by being fixed to at least two bosses disposed so as to protrude from a wall surface of the air flow line. The air flow rate measuring apparatus includes a measuring conduit disposed inside the air flow line so as to envelop a flow rate detecting element; a circuit portion having a control circuit for outputting a flow rate detection signal, the circuit portion being electrically connected to the flow rate detecting element; and mounting portions for fixing to the bosses. The air flow rate measuring apparatus is characterized in that the measuring conduit, the circuit portion, and the mounting portions are constructed as an integrated part, and a position regulating portion for regulating a mounting position by engaging an outer peripheral surface of each of the bosses is formed on each of the mounting portions.

Therefore, provided is an inexpensive air flow rate measuring apparatus having a superior rate of production enabling mountability to an air flow line to be improved and enabling flow rate detection precision to be ensured by suppressing rotational assembly irregularities.

According to a second aspect of the present invention, there is provided an air flow rate measuring apparatus for measuring a rate of air flow flowing inside an air flow line, the air flow rate measuring apparatus being mounted by being fixed at at least two positions by a boss disposed so as to protrude from a wall surface of the air flow line. The air flow rate measuring apparatus includes a measuring conduit disposed inside the air flow line so as to envelop a flow rate detecting element and a joint portion for ensuring airtightness of the air flow line when the measuring conduit is inserted into the air flow line by engaging an insertion aperture of the air flow line. Also, the air flow rate measuring apparatus includes a circuit portion having a control circuit for outputting a flow rate detection signal, the circuit portion being electrically connected to the flow rate detecting element and a mounting portion for fixing to the boss. The air flow rate measuring apparatus is characterized in that the measuring conduit, the joint portion, the circuit portion, and the mounting portion are constructed as an integrated part, and an outer peripheral surface of the joint portion is formed into a continuous curved surface capable of preventing rotation of the joint portion when inserted into the insertion aperture of the air flow line.

Therefore, provided is an inexpensive air flow rate measuring apparatus having a superior rate of production enabling mountability to an air flow line to be improved and enabling flow rate detection precision to be ensured by suppressing rotational assembly irregularities.

BRIEF DESCRIPTION OF THE DRAWINGS

FIG. 7 is a plan explaining a method for mounting the air flow rate measuring apparatus functioning as a comparative example to an air flow line;

FIG. 8 is a plan explaining mounting of the air flow rate measuring apparatus according to Embodiment 1 of the present invention to the air flow line;

DETAILED DESCRIPTION OF THE PREFERRED EMBODIMENTS

Preferred embodiments of the present invention will now be explained with reference to the drawings.

Embodiment 1

Figure 1:
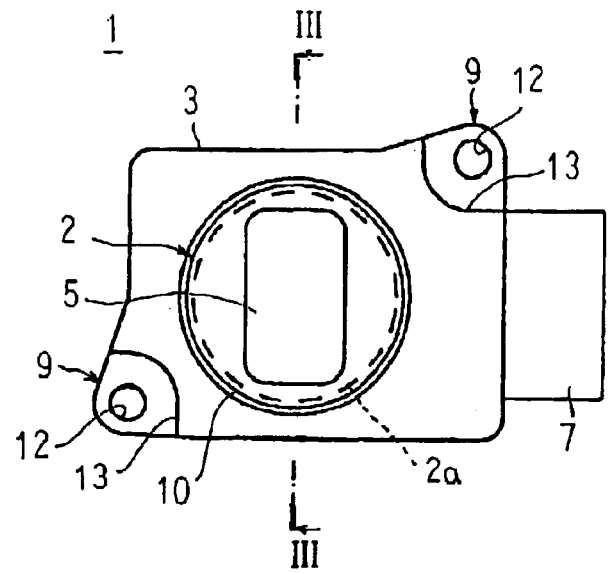
FIG. 1 is a bottom view showing an air flow rate measuring apparatus according to Embodiment 1 of the present invention.
Figure 2:
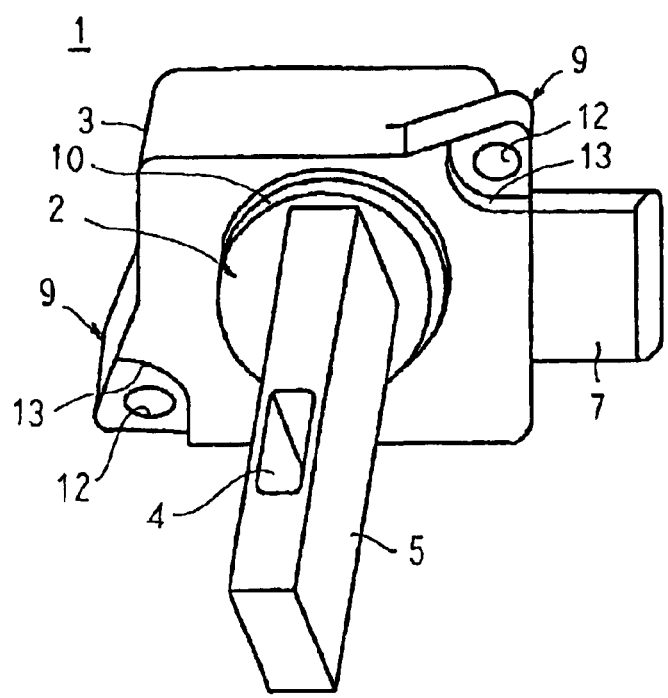
FIG. 2 is a perspective showing the air flow rate measuring apparatus according to Embodiment 1 of the present invention.
Figure 3:
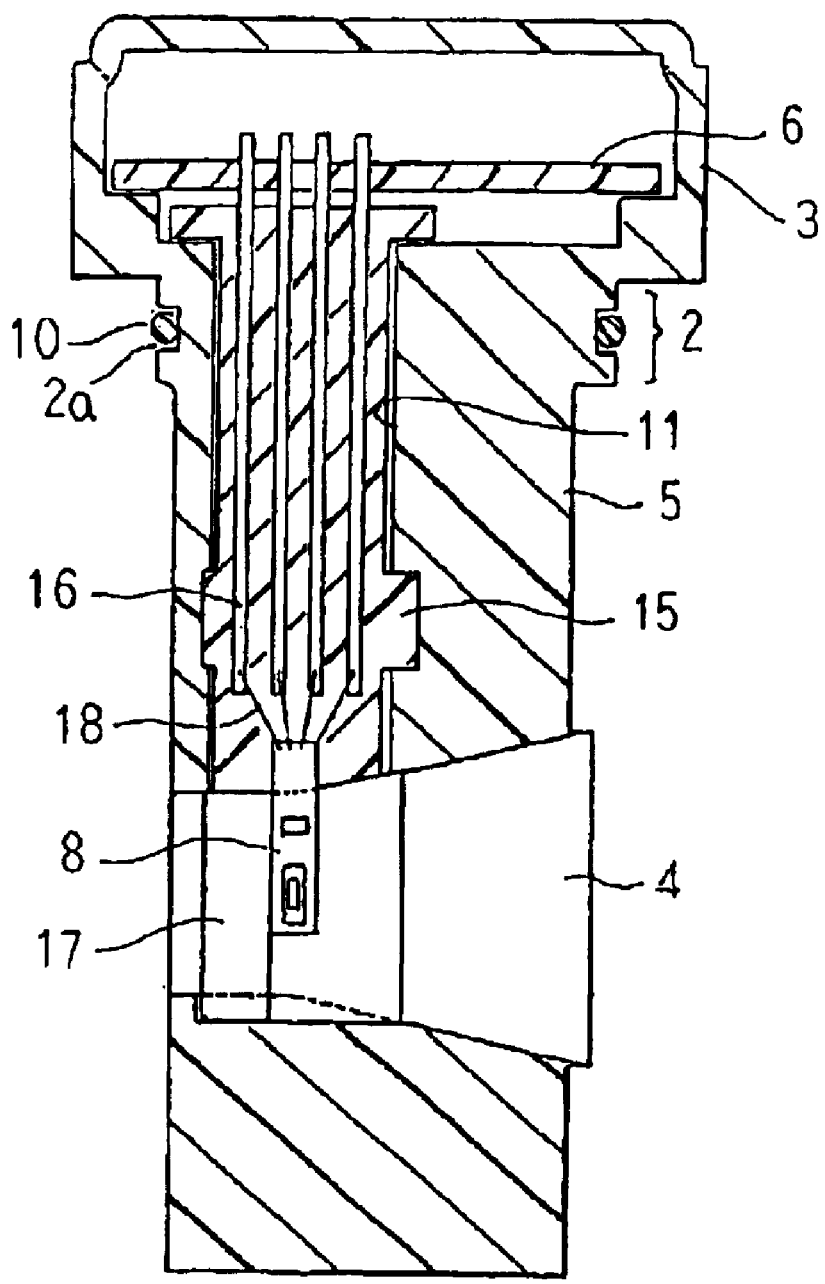
FIG. 3 is a cross section taken along line III—III in FIG. 1 viewed from the direction of the arrows.
Figure 4:
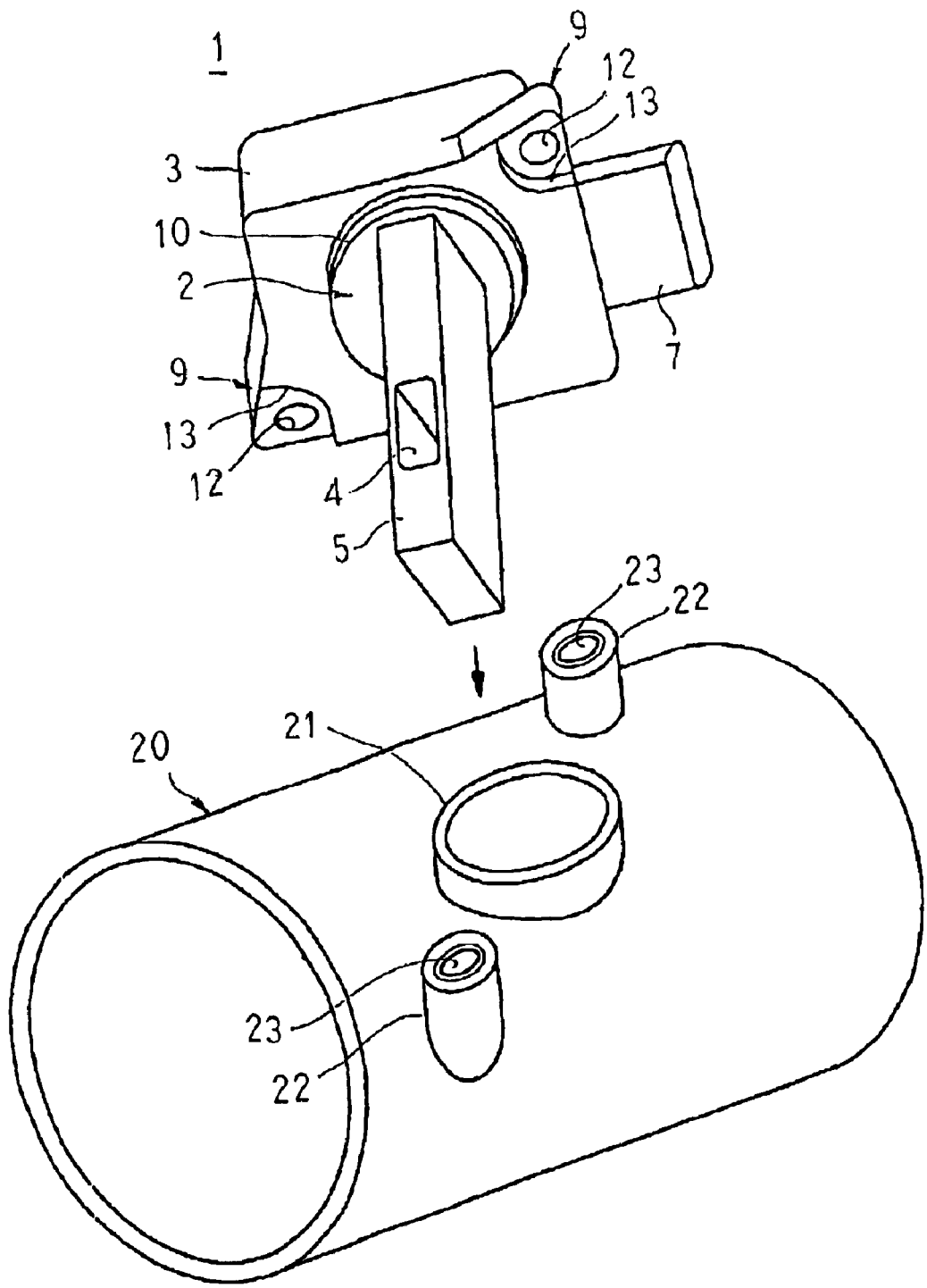
FIG. 4 is a perspective explaining a method for mounting the air flow rate measuring apparatus according to Embodiment 1 of the present invention to an air flow line.

FIGS. 1 and 2 are a bottom view and a perspective, respectively, showing an air flow rate measuring apparatus according to Embodiment 1 of the present invention, FIG. 3 is a cross section taken along line III—III in FIG. 1 viewed from the direction of the arrows, and FIG. 4 is a perspective explaining a method for mounting the air flow rate measuring apparatus according to Embodiment 1 of the present invention to an air flow line.

In FIGS. 1 to 4, an air flow rate measuring apparatus 1 is provided with: a joint portion 2 for ensuring airtightness when inserted into an air flow line 20 through which air being measured flows; a circuit case 3 disposed on a first side of the joint portion 2; a measuring conduit 5 disposed so as to extend from the joint portion 2 on a second side, a detecting channel 4 being formed in a tip end of the measuring conduit 5; a circuit board 6 on which a control circuit for outputting a detected flow rate signal is constructed, the circuit board 6 being housed inside the circuit case 3; an input-output connector portion 7 formed integrally with the circuit case 3; a flow rate detecting element 8 disposed inside the detecting channel 4; and a pair of mounting portions 9 formed integrally with the circuit case 3.

The joint portion 2, the circuit case 3, the connector portion 7, the mounting portions 9, and the measuring conduit 5 are molded integrally using a resin such as a polybutylene terephthalate, for example.

The joint portion 2 is formed with a circular cross section, and a groove portion 2a for mounting an O ring 10 is recessed into an outer peripheral wall surface of the joint portion 2. A housing aperture 11 is disposed through the joint portion 2 and the measuring conduit 5 so as to communicate between the circuit case 3 and the detecting channel 4.

The pair of mounting portions 9 are disposed so as to extend in flange shapes from the circuit case 3 on mutually opposite sides of the joint portion 2. A mounting aperture 12 is disposed through each of the mounting portions 9. Each of the mounting portions 9 is formed so as to have a stepped portion on a lower surface, wall surfaces of the stepped portions being formed into curved shapes following outer peripheral surfaces of a pair of bosses 22, described below, to constitute position regulating portions 13. Moreover, the pair of mounting portions 9 are formed such that a positional relationship between the mounting apertures 12 matches a positional relationship between threaded apertures 23 of the pair of bosses 22 with consideration for dimensional tolerances. The mounting apertures 12 are formed with a larger diameter than the threaded apertures 23.

A base member 15 is prepared into a flat shape using a resin such as a polybutylene terephthalate, etc., for example, lead wires 16 being embedded therein. This base member 15 is housed inside the housing aperture 11, first ends of the lead wires 16 being electrically connected to electrode terminals of the circuit board 6.

A support member 17 is prepared into a flat shape using a resin such as a polybutylene terephthalate, etc., for example, being mounted to the base member 15 so as to project inside the detecting channel 4. A flow rate detecting element 8 is mounted to the support member 17 and disposed inside the detecting channel 4 such that a surface of the flow rate detecting element 8 is positioned on a common plane with a major surface of the support member 17. The major surface of the support member 17 is substantially parallel to an axial direction of the detecting channel 4. Second ends of the lead wires 16 are electrically connected to electrode terminals of the flow rate detecting element 8 by wires 18.

The air flow line 20 is a duct disposed in an air cleaner or downstream from the air cleaner, for example, an insertion aperture 21 being disposed through a wall surface of the air flow line 20, the pair of bosses 22, each having a circular cross section, being disposed so as to protrude from the wall surface on mutually opposite sides of the insertion aperture 21. A threaded aperture 23 is formed in each of the bosses 22.

Here, a circuit portion is constituted by the circuit case 3, the circuit board 6, and the connector 7.

To mount the air flow rate measuring apparatus 1 constructed in this manner to the air flow line 20, the measuring conduit 5 is first inserted into the insertion aperture 21 until the joint portion 2 reaches the insertion aperture 21. Then, the measuring conduit 5 is pushed further in with the mounting apertures 12 of the mounting portions 9 positioned generally above the threaded apertures 23 of the bosses 22. Thus, the joint portion 2 is pushed into the insertion aperture 21 while compressing the O ring 10. The position regulating portions 13 simultaneously engage the outer peripheral surfaces of the bosses 22, positioning the mounting apertures 12 and the threaded apertures 23 of the bosses 22 and placing the mounting portions 9 in contact with the bosses 22. Then, mounting screws (not shown) are passed through the mounting apertures 12 and fastened to the threaded apertures 23 of the bosses 22, mounting the air flow rate measuring apparatus 1 to the air flow line 20.

Next, a method for detecting a flow rate using the air flow rate measuring apparatus 1 will be explained for a construction in which the flow rate detecting element 8 is provided with a resistance heater and a fluid temperature detector, for example.

The control circuit constructed on the circuit board 6 controls an excitation current flowing to the resistance heater such that the temperature of the resistance heater is higher by a predetermined temperature than the temperature of the air as measured by the fluid temperature detector. Then, air flowing inside the air flow line 20 flows into the detecting channel 4 and flows over the element surface of the flow rate detecting element 8.

At this time, if the flow rate of the air is high, the quantity of heat transferred to the air from the resistance heater increases, lowering the temperature of the resistance heater. Then, the control circuit increases the amount of electric current flowing to the resistance heater to compensate for the quantity of heat transferred to the air, maintaining the temperature of the resistance heater at the predetermined temperature. On the other hand, if the flow rate of the air is low, the quantity of heat transferred to the air from the resistance heater decreases, raising the temperature of the resistance heater. Then, the control circuit decreases the amount of electric current flowing to the resistance heater, maintaining the temperature of the resistance heater at the predetermined temperature.

The flow rate of the air flowing inside the passage, which has a predetermined passage cross-sectional area, is detected by detecting the value of the excitation current flowing to the resistance heater and outputting it as an air flow rate signal. Similarly, it is also possible to detect air flow velocity.

Thus, the air flow rate measuring apparatus 1 introduces the air flowing inside the air flow line 20 into the detecting channel 4 and detects the rate of air flow flowing inside the detecting channel 4. Then, the rate of air flow flowing inside the air flow line 20 is obtained from the detected rate of air flow flowing inside the detecting channel 4. Thus, because irregularities in the mounting angle of the air flow rate measuring apparatus 1 to the air flow line 20 give rise to irregularities in the quantity of uptake of air to the detecting channel 4, for example, and become a factor in the lowering of flow rate detection precision, it is necessary to raise the precision of the mounting of the air flow rate measuring apparatus 1 to the air flow line 20.

Actions and effects of the air flow rate measuring apparatus 1 according to Embodiment 1 will now be explained while making a comparison with an air flow rate measuring apparatus 50 as a comparative example.

Figure 5:
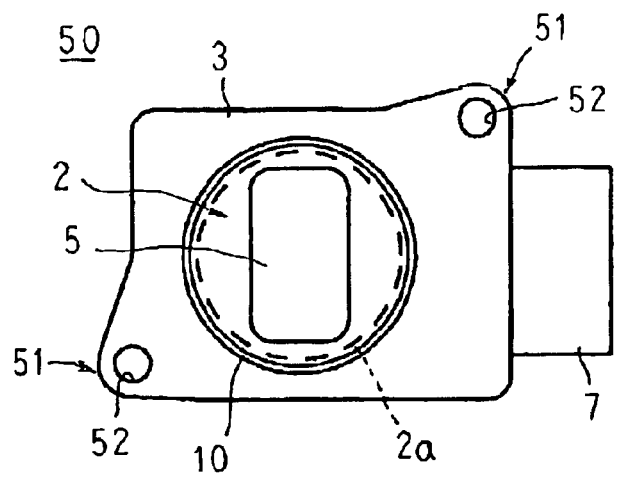
FIG. 5 is a bottom view showing an air flow rate measuring apparatus functioning as a comparative example.
Figure 6:
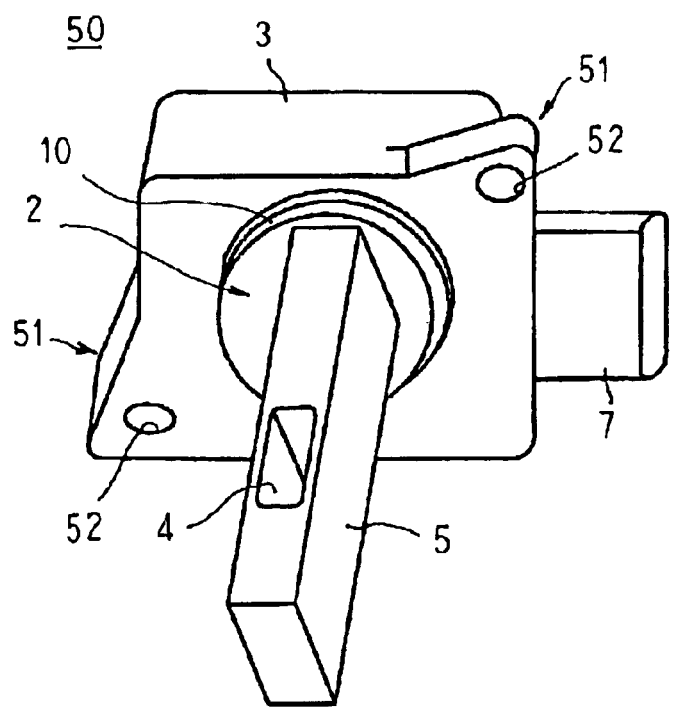
FIG. 6 is a perspective showing the air flow rate measuring apparatus functioning as a comparative example.

In the air flow rate measuring apparatus 50 functioning as the comparative example, as shown in FIGS. 5 and 6, a pair of mounting portions 51 are disposed so as to extend from the circuit case 3 on mutually opposite sides of the joint portion 2, and a mounting aperture 52 is disposed through each of the mounting portions 51. In the comparative air flow rate measuring apparatus 50, lower surfaces of the mounting portions 51 are formed into flat surfaces in a similar manner to the first conventional air flow rate measuring apparatus. Except for the construction of the mounting portions 51, the comparative air flow rate measuring apparatus 50 is constructed in a similar manner to the air flow rate measuring apparatus 1 of the present invention.

Because the lower surfaces of the mounting portions 51 are formed into flat surfaces, the range of rotational movement of the comparative air flow rate measuring apparatus 50 is large when the measuring conduit 5 of the air flow rate measuring apparatus 50 is inserted into the insertion aperture 21 of the air flow line 20. Thus, when the comparative air flow rate measuring apparatus 50 is inserted as shown in FIG. 7, for example, the mounting apertures 52 and the threaded apertures 23 of the bosses 22 are misaligned, preventing fastening with the mounting screws. Thus, positioning between the mounting apertures 52 and the threaded apertures 23 of the bosses 22 must be performed by rotating the comparative air flow rate measuring apparatus 50.

In some cases, even if the fastening of one screw is performed, the other screw cannot be fastened, and fine adjustments must be made to the positions of the mounting aperture 52 and the threaded apertures 23 of the bosses 22 by loosening the screw fastened initially. In other words, a situation arises in which the mounting screws must be fastened twice.

On the other hand, when the measuring conduit 5 of the air flow rate measuring apparatus 1 of the present invention is inserted into the insertion aperture 21 of the air flow line 20, the positions of the mounting apertures 12 and the threaded apertures 23 of the bosses 22 are aligned because the position regulating portions 13 engage the outer peripheral surfaces of the bosses 22 as shown in FIG. 8. Thus, the operation of fastening with the mounting screws can be performed immediately.

In this manner, according to Embodiment 1, because the position regulating portions 13 are formed on the lower surface of the mounting portions 9, the position regulating portions 13 engage the bosses 22 when the measuring conduit 5 is inserted into the insertion aperture 21 of the air flow line 20, suppressing rotational movement of the air flow rate measuring apparatus 1. Thus, the measuring conduit 5 can be inserted into the insertion aperture 21 with positioning between the mounting apertures 12 and the threaded apertures 23 of the bosses 22 generally in a desired state.

For that reason, the operation of positioning the mounting apertures 12 and the threaded apertures 23 of the bosses 22 required in the comparative examples can be omitted, improving workability of mounting of the air flow rate measuring apparatus 1 onto the air flow line 20. Furthermore, repeated fastening of the mounting screws is also reliably eliminated, improving the workability of assembly. In addition, irregularities in the mounting angle of the air flow rate measuring apparatus 1 to the air flow line 20 are suppressed, enabling flow rate detection precision to be ensured.

Because the position regulating portions 13 can be formed integrally with the circuit case 3 during molding and it is not necessary to perform any special machining on the bosses 21, the rate of production is improved, enabling cost reductions. In addition, because positioning of the air flow rate measuring apparatus 1 and the air flow line 20 is performed using existing bosses 21, it is not necessary to dispose new portions on the air flow line 20 for engaging the position regulating portions 13, enabling a common air flow line to be used, thereby enabling cost reductions.

Because the position regulating portions 13 are constructed on wall surfaces of the stepped portions, stable positioning can be performed without damaging the position regulating portions 13 during mounting of the air flow rate measuring apparatus.

Moreover, in Embodiment 1 above, the base member 15 is constructed as a separate part from the measuring conduit 5 but may be constructed integrally by molding. In that case, the lead wires 16 are insert molded.

In Embodiment 1 above, the joint portion 2, the circuit case 3, and the measuring conduit 5 are molded integrally, but the joint portion 2, the circuit case 3, and the measuring conduit 5 may also be constructed as separate parts and then integrated by fixing with an adhesive, etc.

In Embodiment 1 above, the air flow rate measuring apparatus is not explained as being mounted with an intake air temperature sensor, but the air flow rate measuring apparatus will also exhibit similar effects if an intake air temperature sensor is disposed on a side surface of the measuring conduit 5.

In Embodiment 1 above, the bosses 22 are each formed into a cylindrical shape, but the shape of the bosses is not limited to a cylindrical shape provided that it is a protruding shape having a threaded aperture and for example, may also be a rectangular prism, an elliptic cylinder, a polygon prism, etc. In that case, the position regulating portions 13 are formed with surface shapes matching the outer peripheral surfaces of the bosses.

In Embodiment 1 above, two bosses 22 are disposed on the air flow line 20, but the number of bosses 22 is not limited to two and may also be three or more. In that case, the number of mounting portions 9 provided is equal to the number of bosses 22.

In Embodiment 1 above, the flow rate detecting element 8 is explained as being provided with a resistance heater and a fluid temperature detector, but it goes without saying that the flow rate detecting element is not limited to this construction provided that the flow rate of the air can be detected.

Embodiment 2

Figure 9:
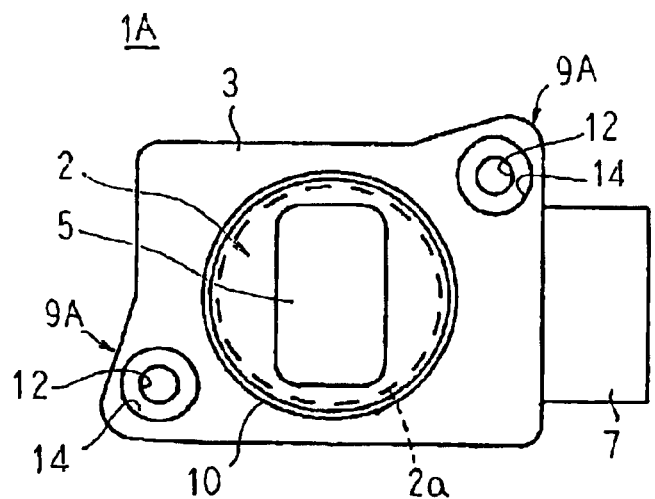
FIG. 9 is a bottom view showing an air flow rate measuring apparatus according to Embodiment 2 of the present invention.
Figure 10:
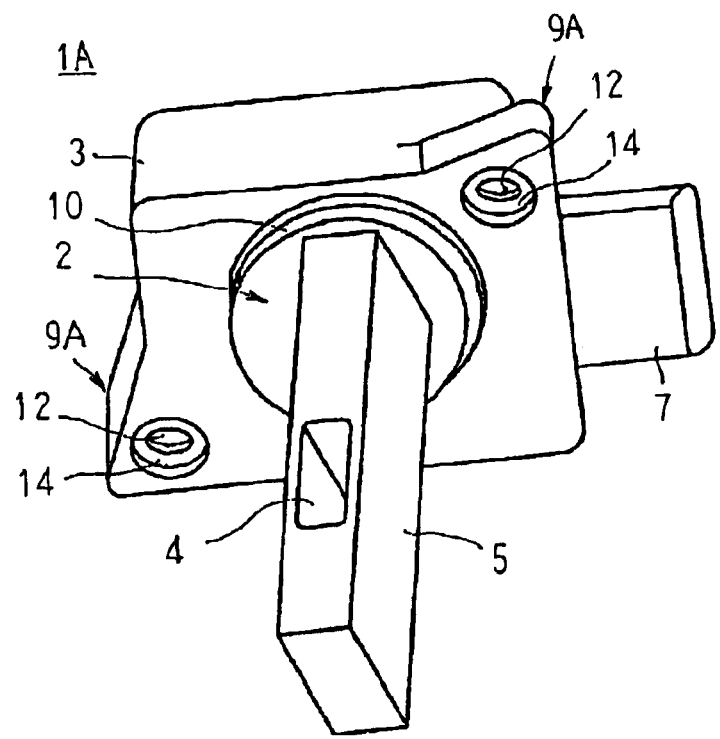
FIG. 10 is a perspective showing the air flow rate measuring apparatus according to Embodiment 2 of the present invention.

FIGS. 9 and 10 are a bottom view and a perspective, respectively, showing an air flow rate measuring apparatus according to Embodiment 2 of the present invention.

In FIGS. 9 and 10, a pair of mounting portions 9A are disposed so as to extend in flange shapes from the circuit case 3 on mutually opposite sides of the joint portion 2. A mounting aperture 12 is disposed through each of the mounting portions 9A. A position regulating portion 14 is formed into a recessed aperture concentric with the mounting aperture 12 on a lower surface of each of the mounting portions 9A. Here, the pair of mounting portions 9A are formed such that a positional relationship between the mounting apertures 12 matches a positional relationship between threaded apertures 23 of the bosses 22 with consideration for dimensional tolerances. The position regulating portions 14 are set to an aperture diameter enabling them to fit over the bosses 22.

Moreover, the rest of this embodiment is constructed in a similar manner to Embodiment 1 above.

When the air flow rate measuring apparatus 50 functioning as a comparative example is mounted to the air flow line 20, the measuring conduit 5 is inserted into the insertion aperture 21, then positioning between the mounting apertures 52 and the threaded apertures 23 is performed by rotating the air flow rate measuring apparatus 50. At this time, because no adaptation has been made to the mounting portions 51 in the comparative air flow rate measuring apparatus 50, rotation of the air flow rate measuring apparatus 50 is possible as long as the threaded apertures 23 do not project beyond the mounting apertures 52, in other words, as long as fastening with screws is not hindered. Consequently, the mounting angle of the comparative air flow rate measuring apparatus 50 to the air flow line 20 may be irregular, lowering flow rate detection precision. In some cases, even if the fastening of one screw is performed, the other screw cannot be fastened, and fine adjustments must be made to the positions of the mounting aperture 52 and the threaded apertures 23 of the bosses 22 by loosening the screw fastened initially. In other words, a situation arises in which the mounting screws must be fastened twice.

In an air flow rate measuring apparatus 1A according to Embodiment 2, the position regulating portions 14 are set to an aperture diameter enabling them fit over the bosses 22. Thus, the position regulating portions 14 are fitted over the bosses 22 by inserting the measuring conduit 5 of the air flow rate measuring apparatus 1A into the insertion aperture 21, thereby positioning the air flow rate measuring apparatus 1A relative to the air flow line 20.

As a result, irregularities in the mounting angle are substantially eliminated, enabling the air flow rate measuring apparatus 1A to be mounted to the air flow line 20 with the positional relationship of the detecting channel 4 relative to the air flow line 20 always ensured to be in a set state, thereby providing stable flow rate detection precision. The operation of positioning the mounting apertures 12 and the threaded apertures 23 of the bosses 22 and the operation of fastening the mounting screws twice required in the comparative example can also be omitted.

Embodiment 3

Figure 11:
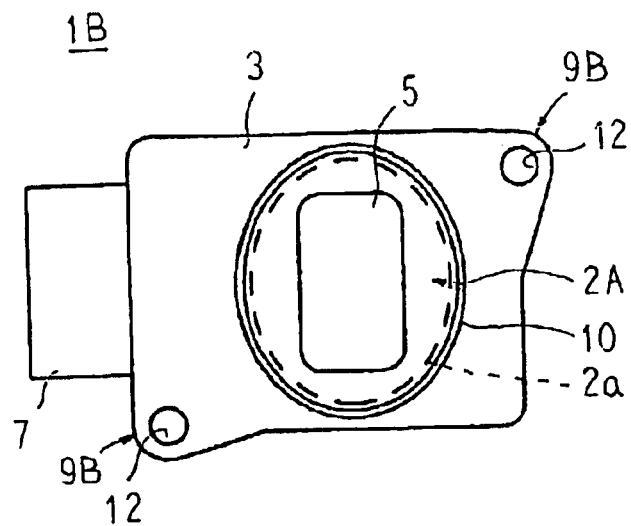
FIG. 11 is a bottom view showing an air flow rate measuring apparatus according to Embodiment 3 of the present invention.
Figure 12:
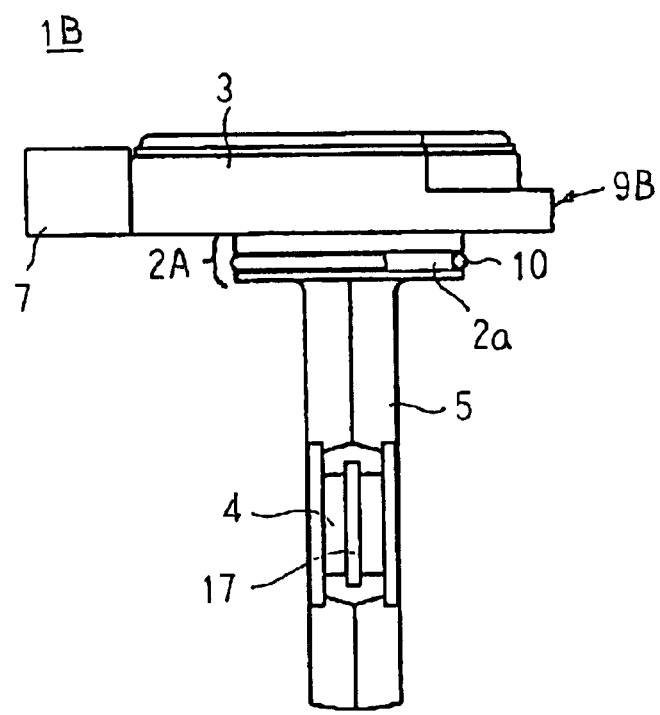
FIG. 12 is a front elevation showing the air flow rate measuring apparatus according to Embodiment 3 of the present invention.
Figure 13:
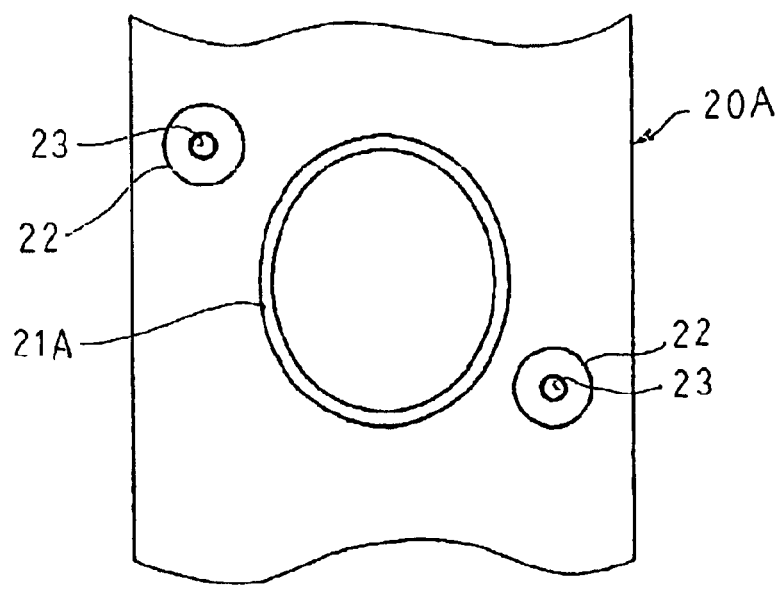
FIG. 13 is a top view showing an air flow line to which the air flow rate measuring apparatus according to Embodiment 3 of the present invention is mounted.

FIGS. 11 and 12 are a bottom view and a perspective, respectively, showing an air flow rate measuring apparatus according to Embodiment 3 of the present invention, and FIG. 13 is a top view showing an air flow line to which the air flow rate measuring apparatus according to Embodiment 3 of the present invention is mounted.

In FIGS. 11 and 12, a joint portion 2A is formed with an elliptical cross section, and mounting portions 9B are formed such that a positional relationship between mounting apertures 12 matches a positional relationship between threaded apertures 23 of the bosses 22 with consideration for dimensional tolerances. Lower surfaces of the mounting portions 9b are formed into flat surfaces. Furthermore, an inner radial shape of an insertion aperture 21A of an air flow line 20A is formed into an elliptical shape generally matching the elliptical cross section of the joint portion 2A.

Moreover, the rest of this embodiment is constructed in a similar manner to Embodiment 1 above.

To mount an air flow rate measuring apparatus 1B constructed in this manner to the air flow line 20A, the measuring conduit 5 is first inserted into the insertion aperture 21A until the joint portion 2A reaches the insertion aperture 21A. Then, the measuring conduit 5 is pushed further in with the mounting apertures 12 of the mounting portions 9B positioned generally above the threaded apertures 23 of the bosses 22. Thus, the joint portion 2A is pushed into the insertion aperture 21A while compressing the O ring 10. At this time, the joint portion 2A having the elliptical cross section is pushed inside the insertion aperture 21A such that rotation is regulated by the elliptical insertion aperture 21A. Thus, the mounting apertures 12 and the threaded apertures 23 of the bosses 22 are positioned, and the mounting portions 9A are placed in contact with the bosses 22. Then, mounting screws (not shown) are passed through the mounting apertures 12 and fastened to the threaded apertures 23 of the bosses 22, mounting the air flow rate measuring apparatus 1B to the air flow line 20A.

Thus, according to Embodiment 3, because the joint portion 2A is formed with an elliptical cross section, by forming the insertion aperture 21A of the air flow line 20A into an ellipse equivalent to the outer shape of the joint portion 2A, positioning of the mounting apertures 12 and the threaded apertures 23 of the bosses 22 can be performed simply by inserting the joint portion 2A into the insertion aperture 21A, thereby achieving similar effects to those in Embodiment 1 above.

Because the outer peripheral wall surface of the joint portion 2A is constituted by a continuous curved surface, there is no loss of airtightness in the air flow line 20A even using a common O ring 10. Moreover, a "common" O ring is any O ring formed into an annular shape having an O-shaped cross section.

Now, in Embodiment 3 above, because the joint portion 2A is provided with the function of the position regulating portions, the position regulating portions 13 of the mounting portions 9 in Embodiment 1 above are no longer necessary. Thus, it is not necessary to dispose two bosses 22 on the air flow line 20A, and one large boss may be disposed in a vicinity of the insertion aperture 21A instead and two threaded apertures 23 formed in that boss.

Furthermore, the number of bosses (threaded apertures) is not limited to two; three or more may also be disposed. In that case, an equivalent number of mounting portions 9b (or mounting apertures 12) are disposed so as to correspond to the number of bosses (or threaded apertures).

Embodiment 4

Figure 14:
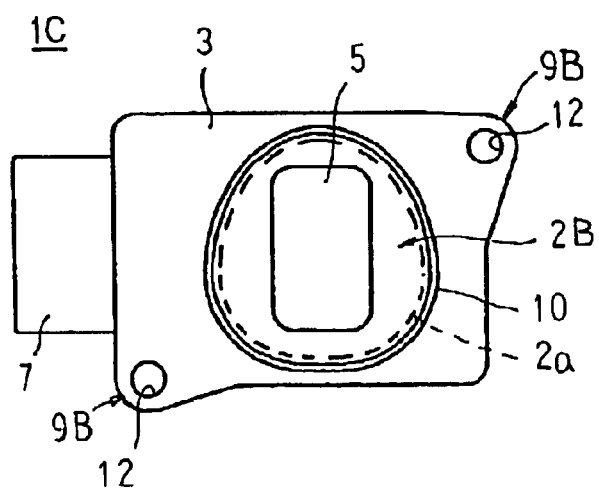
FIG. 14 is a bottom view showing an air flow rate measuring apparatus according to Embodiment 4 of the present invention.
Figure 15:
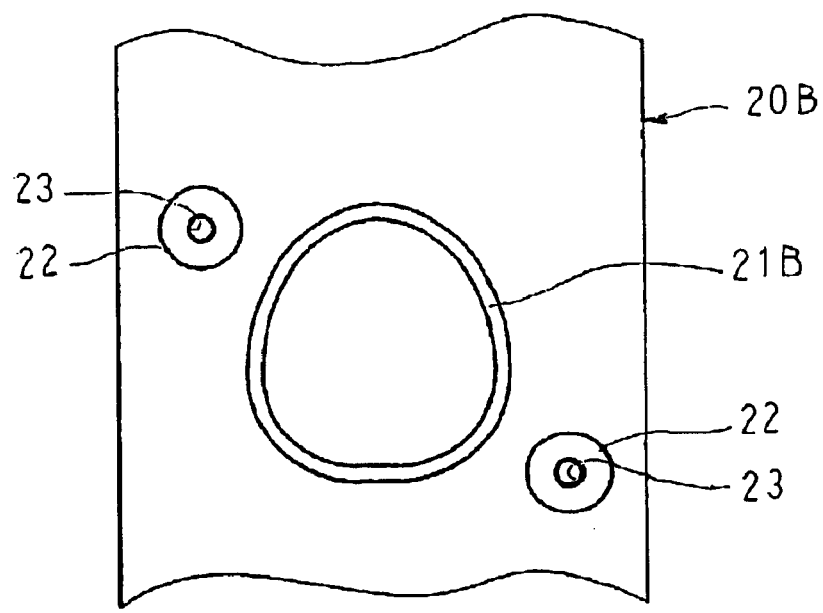
FIG. 15 is a top view showing an air flow line to which the air flow rate measuring apparatus according to Embodiment 4 of the present invention is mounted.

In Embodiment 3 above, the joint portion 2A is formed with an elliptical cross section, but in Embodiment 4, as shown in FIG. 14, a joint portion 2B is formed with an ovoid cross section. An inner radial shape of an insertion aperture 21B of an air flow line 20B, as shown in FIG. 15, is formed into an ovoid shape generally matching the ovoid cross section of the joint portion 2B.

Moreover, the rest of this embodiment is constructed in a similar manner to Embodiment 3 above.

In an air flow rate measuring apparatus 1C constructed in this manner, the joint portion 2B having the ovoid cross section is pushed inside the insertion aperture 21B such that toration is regulated by the ovoid insertion aperture 21B, positioning the mounting apertures 12 and the threaded apertures 23 of the bosses 22.

Consequently, similar effects to those in Embodiment 3 above are also exhibited in Embodiment 4.

Embodiment 5

Figure 16:
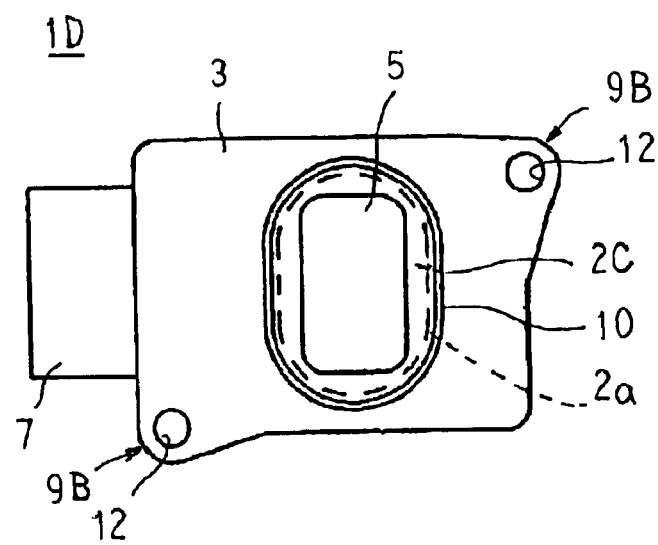
FIG. 16 is a bottom view showing an air flow rate measuring apparatus according to Embodiment 5 of the present invention.
Figure 17:
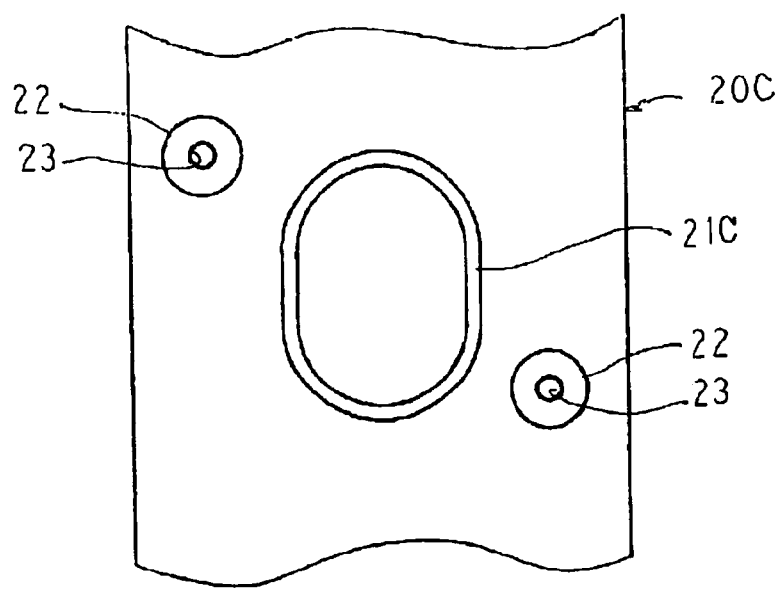
FIG. 17 is a top view showing an air flow line to which the air flow rate measuring apparatus according to Embodiment 5 of the present invention is mounted.

In Embodiment 3 above, the joint portion 2A is formed with an elliptical cross section, but in Embodiment 5, as shown in FIG. 16, a joint portion 2C is formed with an oval cross section. An inner radial shape of an insertion aperture 21C of an air flow line 20C, as shown in FIG. 17, is formed into an oval shape generally matching the oval cross section of the joint portion 2C.

Moreover, the rest of this embodiment is constructed in a similar manner to Embodiment 3 above.

In an air flow rate measuring apparatus 1D constructed in this manner, the joint portion 2C having the oval cross section is pushed inside the insertion aperture 21C such that rotation is regulated by the oval insertion aperture 21C, positioning the mounting apertures 12 and the threaded apertures 23 of the bosses 22.

Consequently, similar effects to those in Embodiment 3 above are also exhibited in Embodiment 5.

Embodiment 6

Figure 18:
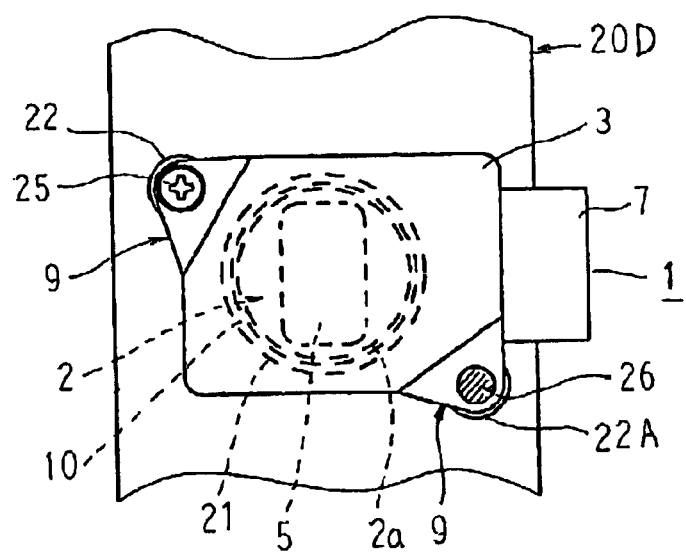
FIG. 18 is a plan explaining a construction for mounting an air flow rate measuring apparatus according to Embodiment 6 of the present invention to an air flow line.
Figure 19:
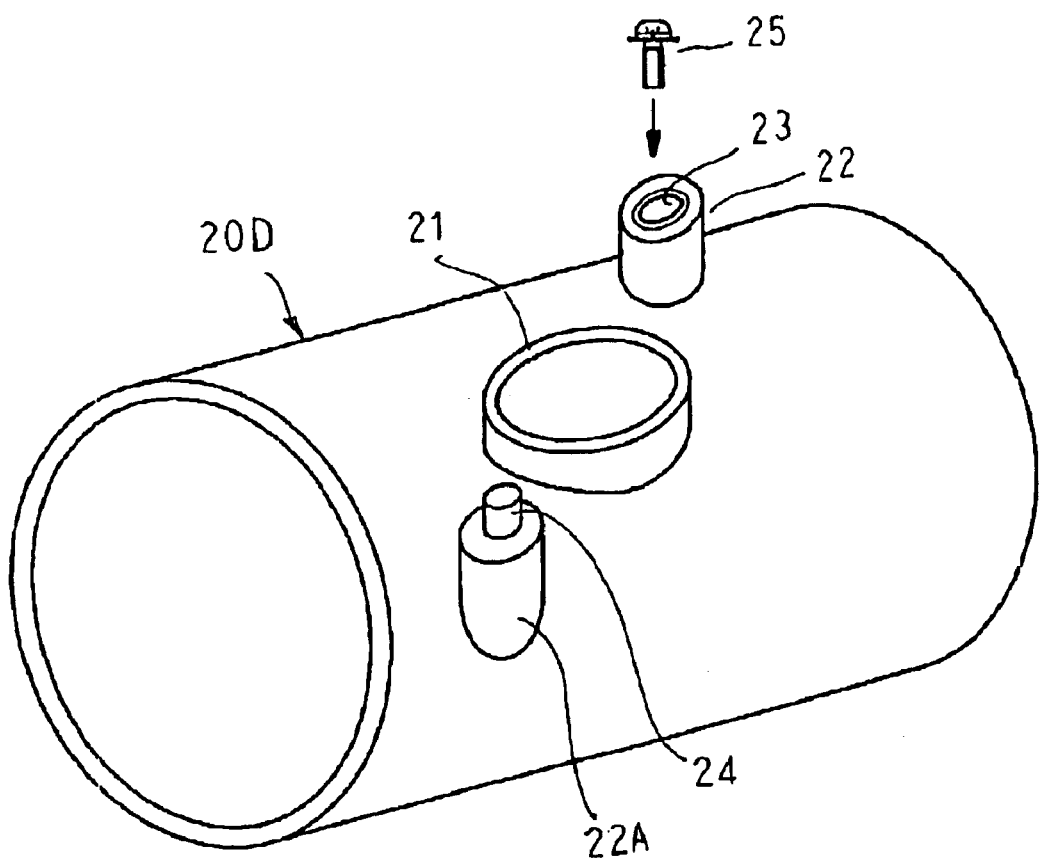
FIG. 19 is a perspective showing an air flow line to which the construction for mounting the air flow rate measuring apparatus according to Embodiment 6 of the present invention is applied.

FIG. 18 is a plan explaining a construction for mounting a air flow rate measuring apparatus according to Embodiment 6 of the present invention to the air flow line, and FIG. 19 is a perspective showing an air flow line to which the construction for mounting the air flow rate measuring apparatus according to Embodiment 6 of the present invention is applied.

In FIGS. 18 and 19, two (first and second) bosses 22 and 22A are disposed on an air flow line 20D, a threaded aperture 23 being formed in the first boss 22 and a protrusion 24 being formed on the second boss 22A. An air flow rate measuring apparatus 1 is mounted to the air flow line 20D by fastening a mounting screw 25 passed through a first mounting aperture 12 to the threaded aperture 23 of the first boss 22 and heat-fusing the protrusion 24 of the second boss 22A passed through a second mounting aperture 12 so as to be fixed to the mounting portions 9. Moreover, the numeral 26 in FIG. 18 indicates the heat-welded portion.

In Embodiment 6, the measuring conduit 5 is first inserted into the insertion aperture 21 until the joint portion 2 reaches the insertion aperture 21. Then, the measuring conduit 5 is pushed further in with the mounting apertures 12 of the mounting portions 9 positioned generally above the threaded aperture 23 of the first boss 22 and above the protrusion 24 of the second boss 22A. Thus, the joint portion 2 is pushed into the insertion aperture 21 while compressing the O ring 10. The position regulating portions 13 simultaneously engage the outer peripheral surfaces of the bosses 22 and 22A, positioning the mounting apertures 12 and the threaded aperture 23 of the first boss 22 and the protrusion 24 of the second boss 22A and placing the mounting portions 9 in contact with the bosses 22 and 22A. At this time, the protrusion 24 is inserted into the second mounting aperture 12.

Then, a portion of the protrusion 24 projecting through the mounting apertures 12 is heat-fused, fixing the second mounting portion 9 and the second boss 22A. Then, a mounting screw 25 is passed through the first mounting aperture 12 and fastened to the threaded aperture 23 of the first boss 22, mounting the air flow rate measuring apparatus 1 to the air flow line 20D.

According to Embodiment 6, one mounting portion 9 of the air flow rate measuring apparatus 1 and one boss 22A of the air flow line 20D are fixed by heat-fusing the protrusion 24 also known as "heat welding". Position regulating portions 13 constructed in a similar manner to Embodiment 1 above are disposed on the mounting portions 9 of the air flow rate measuring apparatus 1. Thus, mounting positioning accuracy of the air flow rate measuring apparatus 1 is ensured and threaded parts can be reduced while maintaining the effects of Embodiment 1 above.

Furthermore, when the mounting screw 25 is fastened to the first boss 22, the fastening force of the mounting screw 25 acts to offset the second mounting portion 9 from the second boss 22A. In Embodiment 6, because the second mounting portion 9 is heat-welded to the second boss 22A, the positional relationship between the second mounting portion 9 and the second boss 22A will not be misaligned by the fastening force of the mounting screw 25. Thus, irregularities in the mounting angle are reliably suppressed.

Moreover, in Embodiment 6 above, one boss and mounting portion are fixed by heat welding, but both bosses and mounting portions may also be fixed by heat welding. Furthermore, if the number of bosses is three or more, the number of the bosses which are heat-welded is one or more.

In Embodiment 6 above, the air flow rate measuring apparatus 1 according to Embodiment 1 above is used, but similar effects are also exhibited using the air flow rate measuring apparatuses 1A to 1D according to the other embodiments.

What is claimed is:

1. An air flow rate measuring apparatus for measuring a rate of air flow flowing inside an air flow line, said air flow rate measuring apparatus being mounted by being fixed to at least two bosses disposed so as to protrude from a wall surface of said air flow line, said air flow rate measuring apparatus comprising:

a measuring conduit disposed inside said air flow line so as to envelop a flow rate detecting element;

a circuit portion having a control circuit for outputting a flow rate detection signal, said circuit portion being electrically connected to said flow rate detecting element; and mounting portions for fixing to said bosses, wherein said measuring conduit, said circuit portion, and said mounting portions are constructed as an integrated part, and a position regulating portion for regulating a mounting position by engaging an outer peripheral surface of each of said bosses is formed on each of said mounting portions.

2. The air flow rate measuring apparatus according to claim 1, wherein said position regulating portion is formed with a recessed shape fitting over said boss.

3. The air flow rate measuring apparatus according to claim 1, wherein at least one of said mounting portions is fixed to said boss by heat welding.

4. An air flow rate measuring apparatus for measuring a rate of air flow flowing inside an air flow line, said air flow rate measuring apparatus being mounted by being fixed at at least two positions by a boss disposed so as to protrude from a wall surface of said air flow line, said air flow rate measuring apparatus comprising:

a measuring conduit disposed inside said air flow line so as to envelop a flow rate detecting element;

a joint portion for ensuring airtightness of said air flow line when said measuring conduit is inserted into said air flow line by engaging an insertion aperture of said air flow line;

a circuit portion having a control circuit for outputting a flow rate detection signal, said circuit portion being electrically connected to said flow rate detecting element; and a mounting portion for fixing to said boss, wherein said measuring conduit, said joint portion, said circuit portion, and said mounting portion are constructed as an integrated part, and an outer peripheral surface of said joint portion is formed into a continuous curved surface capable of preventing rotation of said joint portion when inserted into said insertion aperture of said air flow line.

5. The air flow rate measuring apparatus according to claim 4, wherein said outer peripheral surface of said joint portion is formed into a shape selected from a group of shapes including an ellipse, an ovoid, and an oval.

6. The air flow rate measuring apparatus according to claim 4, wherein at least one of said mounting portions is fixed to said boss by heat welding.

* * * * *